United States Patent [19]
Elderfield

[11] Patent Number: 5,363,469
[45] Date of Patent: Nov. 8, 1994

[54] LIGHT GUIDE WITH VIRTUALLY CYLINDRICAL CONVEX LENS

[76] Inventor: David V. Elderfield, Site 34, R.R. #4, Calgary, Alberta, Canada, T2M 4L4

[21] Appl. No.: 103,715
[22] Filed: Aug. 10, 1993
[51] Int. Cl.$^5$ ............................................. G02B 6/00
[52] U.S. Cl. .................................... 385/146; 385/147; 385/901; 359/710
[58] Field of Search .................. 385/146, 147, 901; 359/710

[56] References Cited
U.S. PATENT DOCUMENTS

| | | | |
|---|---|---|---|
| 4,203,652 | 5/1980 | Hanada | 359/710 |
| 4,693,567 | 9/1987 | Ozaki | 359/710 |
| 4,799,747 | 1/1989 | Yamakawa | 359/206 |
| 4,807,963 | 2/1989 | Iwasaki | 385/147 |
| 5,059,013 | 10/1991 | Jain | 385/146 |

Primary Examiner—John D. Lee
Assistant Examiner—Phan Thi Heartney
Attorney, Agent, or Firm—Pascal & Associates

[57] ABSTRACT

A light guide is comprised of a laser light source for providing a light beam along a central axis, an optical system for collimating and focusing the beam at infinity, a virtually cylindrical convex lens fixed in a position to intercept the focused beam wherein the angle between the centreline of the beam and the optical surface at its exit point from the lens is an oblique angle whereby the beam is spread radially toward a target, and thereby form a line of light on the target, and whereby the target surface can be located at various distances from the lens while the width of the beam impinging thereon is maintained along a straight line with constant width on a target surface at an angle to the plane thereof.

10 Claims, 2 Drawing Sheets

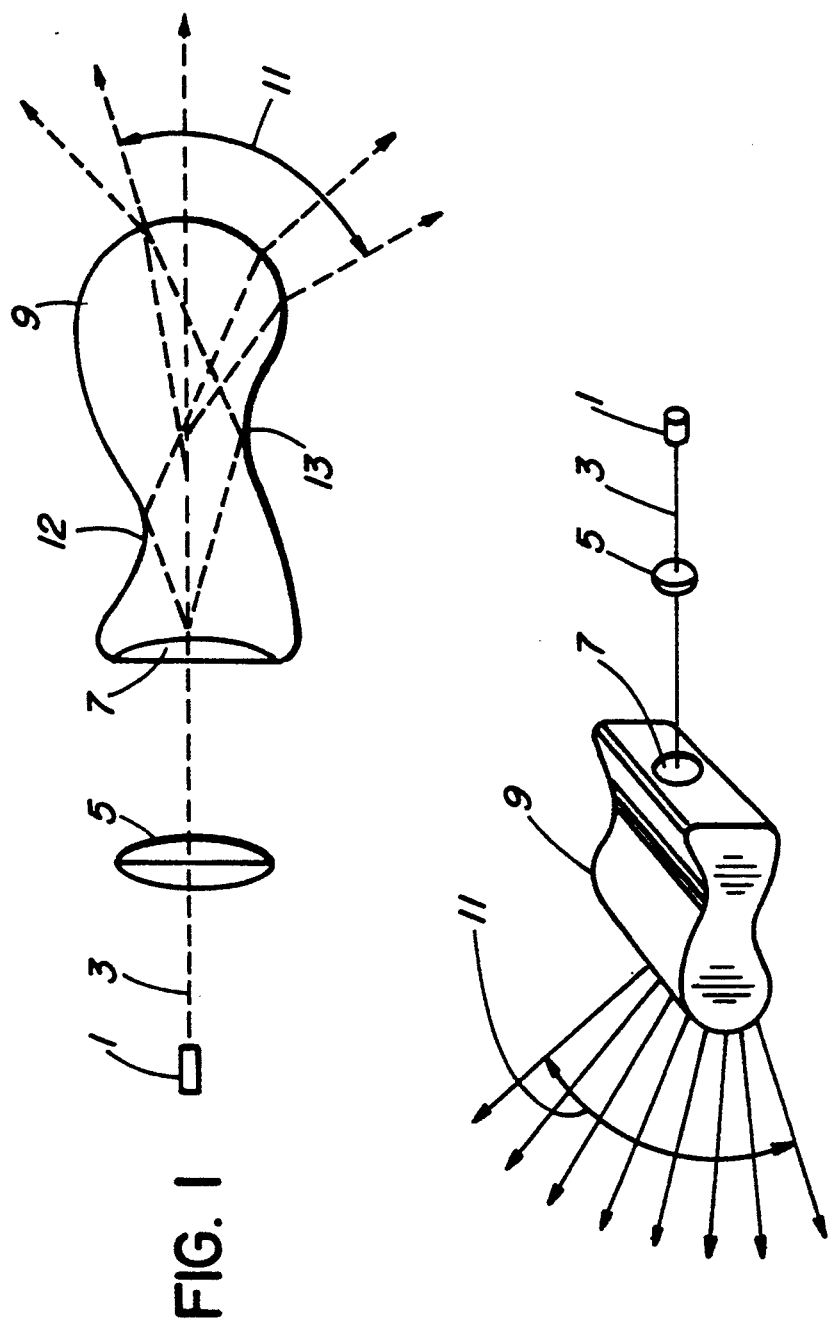

LIGHT GUIDE WITH VIRTUALLY CYLINDRICAL CONVEX LENS

FIELD OF THE INVENTION

This invention relates to a light guide which can be used to indicate a cutting line for saws, a sewing line for sewing machines, etc. on the surfaces of materials.

BACKGROUND TO THE INVENTION

Cutting and sewing lines are usually marked by pencil, chalk or soap which are manually placed on the material to be worked using a straight edge. However where the material to be worked is flexible or when it is not flat, and particularly when it has compound curves, it is difficult to place the mark with accuracy.

The present invention provides a line of light which illuminates such work pieces, thereby allowing the operator to position a blade, sewing machine needle, etc. at the exactly desired cutting position. If desired, only a single point on the work piece need be marked to establish where the line of light should be placed.

Systems for producing position indicating lights are not new. For example, U.S. Pat. No. 4,799,747 issued Jan. 24th, 1989, invented by Yamakawa, produces a line of light. A light beam emitted by a semi-conductor laser passes through a collimator lens and a cylindrical lens. The emitted light beam is in pencil form, and is deflected into a scanning line by means of a mechanical rotated multi-faceted mirror. The scanning point of light is then focused along an axial plane on the surface of a cylindrical drum.

That system is unsuitable for use in the present invention for the reason that the light beam that enters the cylindrical lens experiences no dispersion. Thus it is suitable at this point to indicate a target point but not a cutting line. Dispersion along a line is provided by scanning using the multi-faceted mirror. The presence of a mechanically rotating structure introduces the possibility of error including thickening of the line. Misalignment of any of the multi-faceted mirrors can occur due to vibration, wear, temperature variations, etc., thus thickening and misplacing the line.

In addition, since the rotating drum in Yamakawa is fixed in position relative to the light source and the optics, in order to have the highest resolution for that structure, the light beam should be focused as narrowly as possible on the surface of the drum. If the Yamakawa structure were to scan a line on the surface of a workpiece which is not planar along the scanning line, the light beam would go out of focus, compounding the errors caused by wear, mirror misalignment and mispositioning, etc. The Yamakawa structure clearly has characteristics which would not allow it to be used in a precision workpiece light marking system.

U.S. Pat. No. 4,693,567 issued Sep. 15th, 1987, invented by Ozaki creates a line of light without mechanically rotating structures as in Yamakawa. This structure utilizes a spherical reflector which intercepts a broad beam created by the divergence of a laser beam. Because of the divergence, as stated in the patent the obtained laser beam has a diameter of a few millimeters to several tens of millimeters. This beam is then reflected by a reflector. Clearly such a broad beam is difficult to position precisely, e.g. to less than one millimeter at a distance of two meters as achieved by systems using the present invention.

The beam in Ozaki appears to be focused on a target. A blank spot would result caused by interception of the beam by the reflector, thus providing a non-illuminated spot. The Ozaki structure thus has limitations in marking a structure having a multi-level surface, and would require refocusing for workpieces placed at or having surfaces at various distances from a saw blade, e.g. 2.5 cm to 2.5 m, which variation can be accommodated in the present invention.

U.S. Pat. No. 4,203,652 issued May 20th, 1980 invented by Hanada utilizes a convex lens and a cylindrical lens for collimating a beam. The focal points in this reference are critically placed in order to collimate the beam. There is no dispersion of the light beam. In order to provide a line of light, a reflector such as described in Osaki or in a mechanical system as in Yamakawa would have to be used.

Light marking systems can thus be produced according to the prior art which produce a spot of light, a cross hair or equivalent, or which require mechanical scanning structures.

SUMMARY OF THE INVENTION

The present invention is a structure which provides a line of light usable as a light guide which is highly precise at both short distances from the light source, e.g. 2.5 cm, and is equally precise at large distances, e.g. 2.5 m. No mechanical scanning is required. Further, the line of light can extend fanlike over about 100°, and forms a sharp, precise line over surfaces which vary in distance from the structure, and thus can be used highly effectively with e.g. undulating surfaces.

In the present invention a light source provided by a laser diode is divergent in a plane and at the same time is focused at infinity. Thus over a reasonable working distance from the light guide, the light line is always of constant width on the surface of the work piece (target) which interrupts the light beam. It is also highly visible before a cut is made due to "speckle", which is a property of the laser light provided by the laser diode.

In accordance with an embodiment of the invention, a light guide is comprised of a laser light source for providing a light beam along a central axis, an optical system for collimating and focusing the beam at infinity, a virtually cylindrical convex lens fixed in a position to intercept the focused beam wherein the angle between the centreline of the beam and the optical surface at its exit point from the lens is an oblique angle, whereby the beam is spread radially toward a target, and thereby form a line of light on the target, whereby the target surface can be located at various distances from the lens while the beam impinging thereon is maintained along a straight line with constant width on a surface interrupting the target plane thereof. When the target has an undulating surface, the line of light follows the undulating surface, as shown in FIG. 3.

Because the beam enters the virtually cylindrical lens as noted above, there is dispersion of the light beam in a direction orthogonal to its longitudinal axis, in contrast to the prior art structures in which the light beam enters the lens directly on its central axis, whereby there is no dispersion. Because there is no dispersion in the prior art structures, either a spherical reflector, the opacity of which interrupts the beam, or a mechanical multi-faceted mirror scanning device subject to misadjustment must be used, to form a line of light. None of these deficiencies exist in the present invention. Because the beam in the present invention is focused at infinity, the beam maintains constant width on surfaces interrupting its plane, despite being at various distances from the light guide.

BRIEF INTRODUCTION TO THE DRAWINGS

A better understanding of the invention will be obtained by reference to the detailed description below, in conjunction with the following drawings, in which:

FIG. 1 is a side view of principal elements of the invention,

FIG. 2 is a perspective view of principal elements of the invention, and

DETAILED DESCRIPTION OF THE INVENTION

Figure 3:
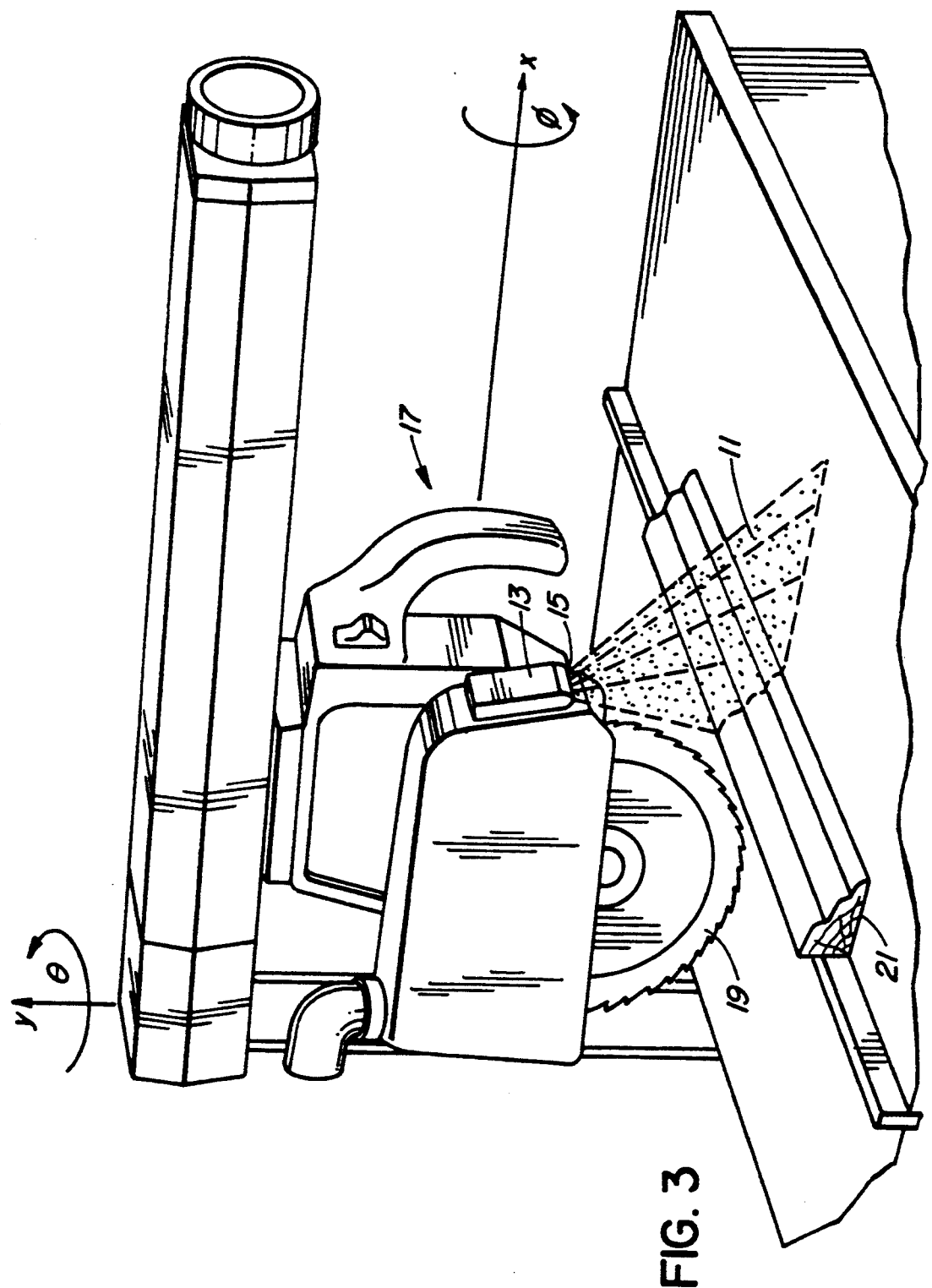
FIG. 3 is a perspective of a saw utilizing the invention.

With reference to FIGS. 1 and 2, a light source 1 which is preferably a laser diode emits a light beam 3 of a given diameter. The light beam is passed through double convex lens 5 which focuses the beam effectively at infinity, so that all the light rays are parallel. This results in a beam of collimated light of constant diameter (non-converging) for a working distance (e.g. +/− 0.15mm over 2.5m).

This constant diameter light beam provides an optimum radius for a following lens 9. That lens is nearly, but is not exactly cylindrical and has a concave entry region 7. The light beam enters lens 9 via concave region 7 so that the virtually cylindrical lens 9 spreads the light into a fan shape 11 which is focused effectively at infinity over at least the distance from lens 9 noted above. It should be noted that if the collimated light entered the lens 9 normal to the surface at the exit from lens 9, the light beam would not be spread radially in a plane, and thus would not achieve the benefits of the present invention.

The lens 9 would be cylindrical but for the additional lensing action required from the concave area 7. Three critical elements of lens 9 are: (i) translational symmetry, i.e. at any point the normal vector to the optical surfaces is perpendicular to the longitudinal axis of the lens, (ii) the longitudinal axis is perpendicular to the entering light beam, and (iii) the extent of the lens is larger than the beam (i.e. the lens is wider than the beam diameter).

The angle between the centreline of the beam 3 and the optical surface at the exit point from the lens 9 is not a normal, but is an oblique angle.

Reference numerals 12 and 13 in FIG. 1 are two surfaces of lens 9 impinging on the beam 3. These surfaces are important as they are TIR (not internal reflection) surfaces. Lens 5 (double convex) focuses the beam at infinity, concavity 7 continues to correct divergence in the horizontal plane but begins to diverge the beam in the vertical plane or plane of concern. The rays that diverge enough to intercept one of the TIR surfaces will at that point increase their angle of divergence from the centreline of the beam by a factor of two to three times. Now the beam is diverged enough that the final optical surface can produce a wide and useful plane of light.

FIG. 3 illustrates the invention in use. The structure shown in FIGS. 1 and 2 are housed in a housing 13 made of e.g. ABS plastic, having a small amount, e.g. 5% graphite for dissipation of electrostatic charges. It is preferred that an acrylic window 15 should be used in front of lens 9 to protect the lenses, laser diode, etc. from damage caused by flying chips, etc., and to provide a smooth surface for easy cleaning.

The structure in its housing is retained at the front of a machine such as radial arm saw 17, with fan shaped beam of light 11 emitted through window 15 at its front, coplanar with a working tool such as radial saw blade 19 to illuminate a workpiece. The light provides a cutting guide on the surface of workpiece 21 which, it may be seen, has a non-planar surface.

Because the light is focused at infinity, and is not dispersive, it will always be of constant width no matter what distance the surface is from the front of the light guide, within the reasonable range, for example, noted above. This can be observed when the structure is rotated around either of the axes $\Theta$ or $\phi$.

There are significant benefits achieved using the present invention, with respect to safety and reduced cycle time, and high accuracy. Since the cutting path is clearly visible before the cut is made, and is enhanced by "speckle" which is a property of laser light, there is a high degree of safety provided to the operator even if the cutting path is covered by sawdust. This also results because due to the collimation, the human eye clearly sees laser light whether focused on it or not. The present invention thus provides a light guide which is always in view, as opposed to a pencil or chalk line, which is often difficult to see in different kinds of light, can smudge, can be covered with dust and chips and can be difficult to align with the saw blade since a drawn line is associated with the work, rather than with the saw blade. The present invention is also significantly more accurate than mechanical aiming devices usually part of or mounted on power saws since such devices require a sight line which can be misaligned depending on the eye position of the operator, and since such mechanical devices often touch the workpiece which can force the mechanical aligning structure out of position.

The present invention also provides reduced cycle time when multiple cuts are to be made, since alignment of the work can be made to the blade by the use of the guide without stopping the blade and moving it forward. Accuracy of positioning has been found to be less than 1 millimeter over about 2 meters, utilizing the present invention.

The present invention can be used with equipment having any sort of moving blades, bending surfaces, bits, needles, etc., for example radial arm saws, chop saws, industrial sewing machines, sheet metal shears, etc.

A person understanding this invention may now conceive of alternative structures and embodiments or variations of the above. All of those which fall within the scope of the claims appended hereto are considered to be part of the present invention.

I claim:

1. A light guide comprising:
   (a) a laser light source for providing a light beam along a central axis,
   (b) an optical system for collimating and focusing the beam at infinity,
   (c) a virtually cylindrical convex lens fixed in a position to intercept the focused beam wherein the angle between the centreline of the beam and an optical surface at an exit point from the lens is an oblique angle whereby the beam is spread radially toward a target, and thereby form a line of light on the target, and whereby the target surface can be located at various distances from said lens while the width of the beam impinging thereon is maintained along a straight line with constant width on a target surface normal to the plane thereof.

2. A light guide as defined in claim 1 in which the optical system is comprised of a coaxially disposed convex lens for collimating and directing the light beam toward said cylindrical lens and a second concave lens for collimating the light beam in a left-right direction in the plane of the axis of said cylindrical lens and diverging the light beam in a plane normal thereto.

3. A light guide as defined in claim 2 in which said cylindrical lens contains upper and lower internal total internal reflection surfaces for intercepting rays of said beam diverged by said concave lens.

4. A light guide as defined in claim 3 in which said concave lens is integral with a light entry region of said cylindrical lens.

5. A light guide as defined in claim 4 in which the laser element is a semiconductor laser diode.

6. A light guide as defined in claim 1 in which the laser element is a semiconductor laser diode.

7. A light guide comprising an optical system mounted on a machine having a working tool, the optical system comprising means for emitting a fan-shaped beam of light which is coplanar with the working tool and is positioned to illuminate a workpiece, the beam of light being focused at infinity, the means for emitting a fan shaped beam of light being comprised of a virtually cylindrical lens fixed in a position to receive a constant diameter collimated light beam emitted by said light source, the axis of the light beam being offset from the axial plane of the virtually cylindrical lens.

8. A light guide as defined in claim 7 in which the optical system is comprised of a laser primary light source for providing a light having the quality of speckle.

9. A light guide as defined in claim 8 in which the optical system is contained in a housing having a smooth transparent window through which the fan shaped beam of light passes.

10. A light guide as defined in claim 9 in which the housing contains conductive or resistive material for dissipating electrostatic charges that may be applied thereto.

* * * * *